United States Patent
Nitu et al.

(10) Patent No.: US 8,543,678 B2
(45) Date of Patent: Sep. 24, 2013

(54) SYNCHRONIZATION METHOD FOR NAT STATIC PORT FORWARDING OBJECTS IN REDUNDANT CONFIGURATIONS

(75) Inventors: Loredana M. Nitu, Kanata (CA); Anand Thiagarajan, Kanata (CA); Gurudas Somadder, San Jose, CA (US); Zihuang Wang, Kanata (CA); Attaullah Zabihi-Seissan, Kanata (CA)

(73) Assignee: Alcatel Lucent, Paris (FR)

( * ) Notice: Subject to any disclaimer, the term of this patent is extended or adjusted under 35 U.S.C. 154(b) by 81 days.

(21) Appl. No.: 13/342,728

(22) Filed: Jan. 3, 2012

(65) Prior Publication Data

US 2013/0173772 A1 Jul. 4, 2013

(51) Int. Cl.
G06F 15/16 (2006.01)
(52) U.S. Cl.
USPC ............................. 709/223; 709/248; 370/350

(58) Field of Classification Search
USPC .......... 709/200–202, 223–224, 248; 370/350
See application file for complete search history.

(56) References Cited

U.S. PATENT DOCUMENTS

| | | | |
|---|---|---|---|
| 6,195,705 B1 * | 2/2001 | Leung | 709/245 |
| 6,487,605 B1 * | 11/2002 | Leung | 709/245 |
| 8,112,660 B2 * | 2/2012 | Safari et al. | 714/4.21 |
| 8,428,057 B2 * | 4/2013 | Valluri et al. | 370/389 |
| 2010/0218033 A1 * | 8/2010 | Safari et al. | 714/4 |
| 2012/0210161 A1 * | 8/2012 | Safari et al. | 714/4.21 |

* cited by examiner

*Primary Examiner* — Moustafa M Meky
(74) *Attorney, Agent, or Firm* — Wall & Tong, LLP

(57) ABSTRACT

The invention is directed to providing a centralized synchronization method for redundant network elements and is particularly advantageous to routers providing network address translation (NAT) services requiring static port forwarding provisioning. Synchronization is provided by a network management system which can handle one or more backup routers or other network elements using a control protocol different from the control protocol used by the active router.

12 Claims, 2 Drawing Sheets

SYNCHRONIZATION METHOD FOR NAT STATIC PORT FORWARDING OBJECTS IN REDUNDANT CONFIGURATIONS

FIELD OF THE INVENTION

The invention is directed to packet switching communication networks, and particularly to managing redundant network elements.

BACKGROUND OF THE INVENTION

Internet Protocol version 4 (IPv4) is limited to 32-bit addresses. As more and more users connect to the Internet, often with multiple devices, address space exhaustion has become a serious problem. Internet Protocol Version 6 (IPv6) has been developed as a standardized solution, using a 128-bit address size. Unfortunately, complete migration to IPv6 is expected to take several years. As one interim solution, Network Address Translation (NAT) is being deployed on a large scale as a way to overcome the address space limitations, moving from the customer premise to the Internet service provider network as a carrier level service. Carrier level services require higher levels of reliability and redundancy than customer premise equipment.

Current approaches of provisioning, and synchronizing static port forwarding entries and other objects on an active redundant system include manual provisioning of the objects without any automated way of keeping this information in sync and are prone to error due to the number of manual steps involved. This is especially problematic in managed networks having redundant heterogeneous network elements that do not have a way of synchronizing this information.

Therefore, a means of providing an improved method of synchronizing NAT static port forwarding objects in redundant configurations is highly desirable.

SUMMARY OF THE INVENTION

An embodiment of the present invention provides a method performed by a network management system for synchronizing an active network element and one or more standby network elements The method comprises steps of: sending to the active network element a provisioning request for a static mapping for a target address; receiving from the active network element a current list of mappings corresponding to the target address; updating a management system database with the current list of mappings corresponding to the target address; and sending to the one or more standby network elements, a provisioning command for the static mapping for the target address.

Some embodiments of the invention further comprise between the step of sending to the active network element a provisioning request and the step of receiving from the network management database a list of mappings, steps of: receiving from the active network element a success/fail response; and responsive to receiving the success response, sending a query to the active network element for mappings corresponding to the target address.

In some embodiments of the invention, the step of updating a management system database further comprises steps of: sending a query to the network management database for mappings corresponding to the target address; receiving from the network management database a list of mappings corresponding to the target address; determining a difference between the current list of mappings from the active network element to the list of mappings from the network management database; and sending an update to the management system database of the difference.

In some embodiments of the invention, the network elements comprise routers supporting network address translation (NAT).

In some embodiments of the invention, the target address comprises an internal Internet Protocol (IP) address.

In some embodiments of the invention, the target address further comprises a port number.

In some embodiments of the invention, the network management system communicates with each the network element using a communication protocol selected from the set of: Simple Network Management Protocol (SNMP); Command Line interface (CLI); and Network Configuration Protocol (NETCONF).

In some embodiments of the invention, the at least one of the network elements is from a different vendor than the other of the network elements.

In some embodiments of the invention, the provisioning request comprises a specific IP address mapping for the target address.

In some embodiments of the invention, the provisioning request is selected from the set of: creating a new mapping; modifying an existing mapping; and deleting an existing mapping.

In some embodiments of the invention, the method is preceded by a step of receiving the provisioning request from a network operator via an Operation Support Services (OSS) Interface.

Another embodiment of the present invention provides a tangible and non-transitory machine-readable storage medium encoded with instructions for execution by a network management system for synchronizing an active network element and one or more standby network elements. The tangible and non-transitory machine-readable storage medium comprises: instructions for sending to the active network element a provisioning request for a static mapping for a target address; instructions for receiving from the active network element a current list of mappings corresponding to the target address; instructions for sending a query to a network management database for mappings corresponding to the target address; instructions for receiving from the network management database a list of mappings corresponding to the target address; instructions for determining a difference between the current list of mappings from the active network element to the list of mappings from the network management database; instructions for sending an update to the management system database of the difference; and instructions for sending to the one or more standby network elements, a provisioning command for the static mapping for the target address.

Still another embodiment of the present invention provides a method performed by a network management system for synchronizing an active network element and one or more standby network elements. The method comprises steps of: sending to the active network element a provisioning request for a static mapping for a target; receiving from the active network element a success/fail response; responsive to receiving the success response, sending a query to the active network element for mappings corresponding to the target; receiving from the active network element a list of mappings corresponding to the target; sending a query to a network management database for mappings corresponding to the target; receiving from the network management database a list of mappings corresponding to the target; determining a difference between the list of mappings from the active network element to the list of mappings from the network management database; sending an update to the management system database of the difference; sending to the one or more standby network elements, a provisioning command for the static mapping for the target.

BRIEF DESCRIPTION OF THE DRAWINGS

Some embodiments of apparatus and/or methods in accordance with embodiments of the present invention are now described, by way of example only, and with reference to the accompanying drawings in which.

In the figures, like features are denoted by like reference characters.

DETAILED DESCRIPTION

Embodiments of the present invention are advantageous to Network Address Translation (NAT) implemented on carrier-grade routers and centrally managed by a network management system. For example, in static port forwarding, specific IP address mapping are pushed to the active router. A standby router protecting the active router would require the same specific IP address mapping to be pushed to it.

Figure 1:
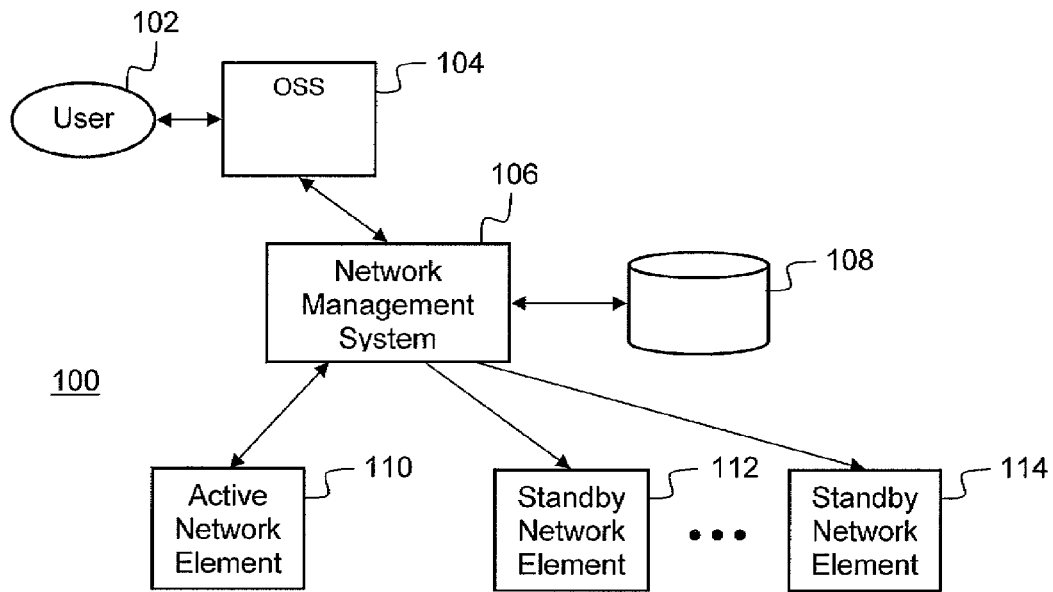
FIG. 1 illustrates a network configuration according to an embodiment of the present invention.

Referring to FIG. 1, network configuration 100 has a network management system (NMS) 106 for managing network elements 110, 112, 114. NMS 106 is in communication with a network management system database 108 which stores network configurations and operating parameters for network elements 110, 112, 114. Note that network management system database 108 can be part of NMS 106 or configured as a separate device in communication with NMS 106. The NMS 106 is controlled by a user 102 through a user interface to an operations support system (OSS) 104. The user interface can be a hypertext markup language (HTML) web browser interface or a text terminal command line interface or other user interface as is well-known in the art. OSS 104 communicates with the NMS 106 to convey user commands to the NMS and convey corresponding responses from the NMS to the user. NMS 106 manages network elements such as active router 110 providing NAT services and one or more standby routers 112 and 114. NMS 106 communicates with the network elements (routers) 110, 112, 114 using a communication protocol such as Simple Network Management Protocol (SNMP), Command Line interface (CLI) or Network Configuration Protocol (NETCONF) Netconf. In some networks, the network elements can be from different vendors and use different communications protocols. The NMS communicates with each network element using the appropriate protocol.

Active network element 110 is operationally active, responsible for fulfilling the application that is responsible for (e.g.: NAT). Standby network elements 112, 114 provide redundancy, both from a scale and resiliency perspective to the active network element 110.

In general, specific objects are provisioned on both the active and the standby network elements that are part of the redundant setup in order for the standby elements to be able to take over in the event of a failure at the active network element. Objects, specific to the target application, are dynamically allocated by the active network element in accordance with a provisioning request and as a function of available local resources. A synchronization method detects the actual set of objects created on the active system and performs the synchronization on the standby system as will be further described below.

For Network Address Translation functionality a Static Port Forwarding allocation request is made to have the option of forwarding external ports to inside addresses and port numbers. Network Address translation functionality is supported in an arrangement of active-standby network element pairs and the static port forwarding allocation must be done identically on both network elements that are part of the redundant configuration.

Figure 2:
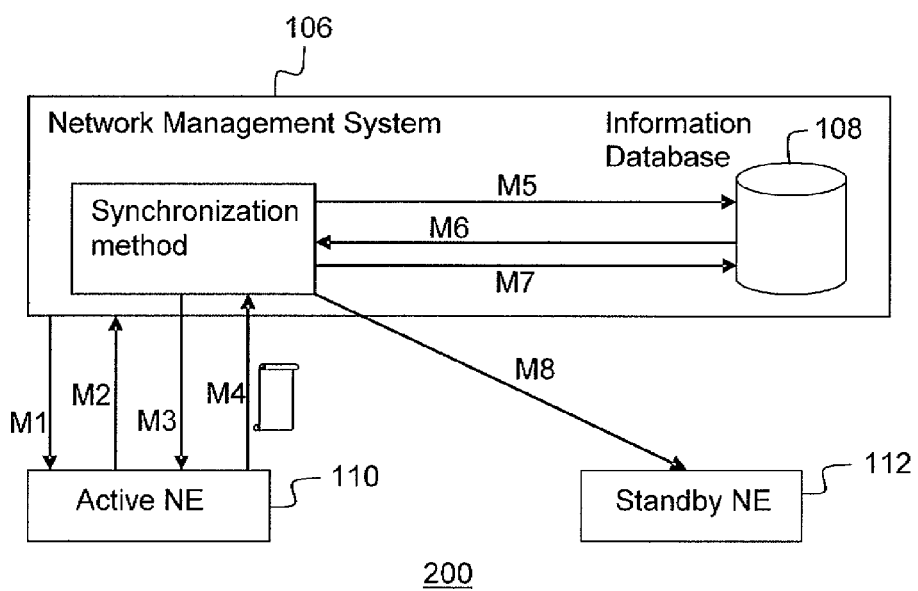
FIG. 2 illustrates a network configuration showing message interactions according to an embodiment of the present invention.
Figure 3:
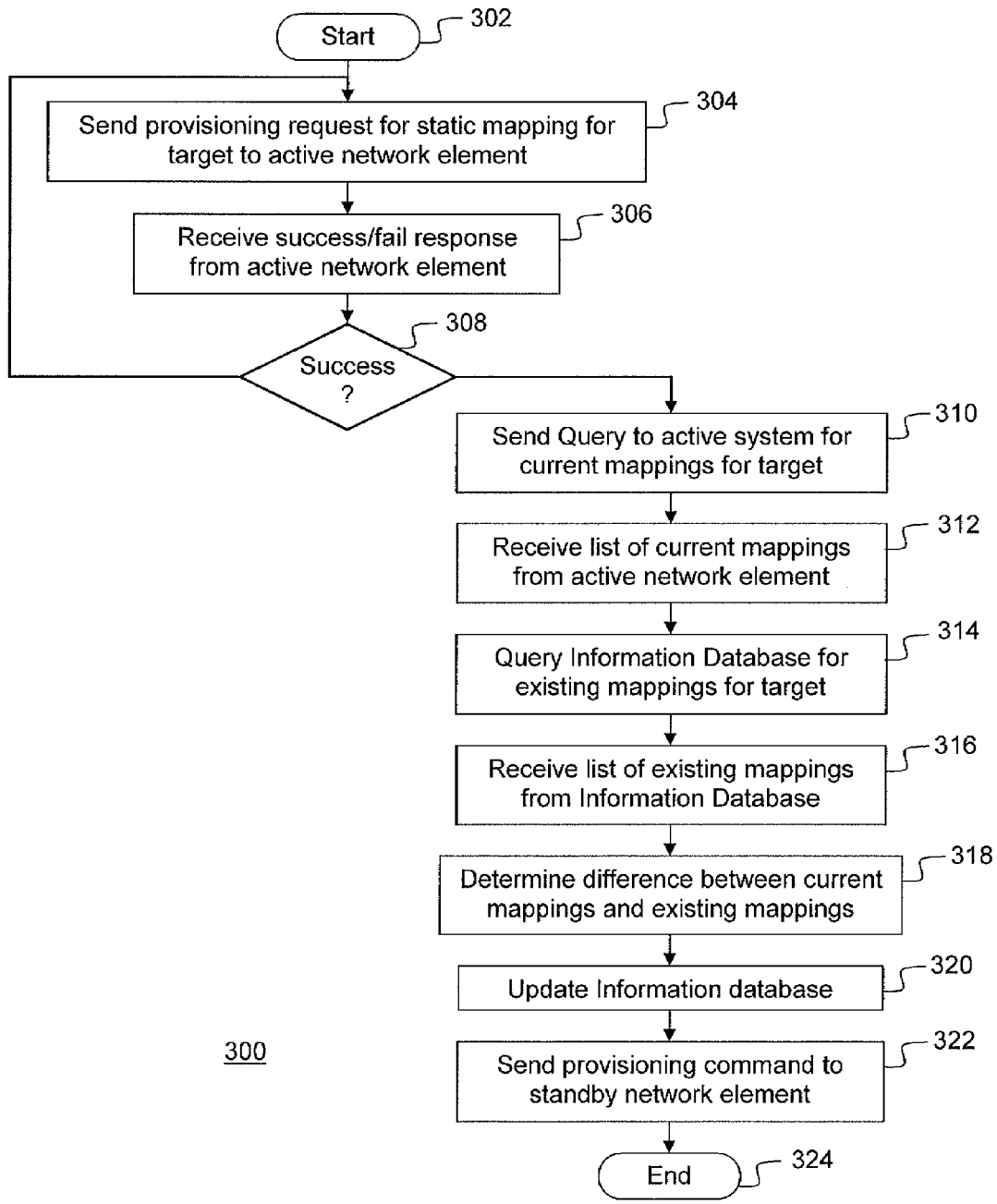
FIG. 3 illustrates a flowchart of a method according to an embodiment of the present invention.

The synchronization process will be described with reference to FIG. 2 and FIG. 3. FIG. 2 illustrates a network configuration 200 similar to the network configuration 100 of FIG. 1, showing message interactions for the synchronization method. FIG. 3 illustrates a flowchart of the synchronization method.

The process starts at step 302. At step 304, the NMS 106 sends a provisioning request M1 for static mapping for a target address to active network element 110. In the context of network address translation, the static mapping is for a static port forwarding mapping and the target address is an internal IP address and optionally a port number to be mapped to an external IP address and optionally to a port number. The provisioning request can be to create a new mapping, to modify an existing mapping or to delete an existing mapping. A provisioning request to create a new mapping can specify a specific external IP address, specify a range of external IP addresses or use a wildcard so that an available external IP address can be assigned automatically. A provisioning request can also specify a protocol (TCP/UDP, ICMP, etc.) and a lifetime over which the provisioning will remain in effect.

At step 306 the NMS 106 receives a response message M2 from active network element 110, indicating a success or fail to the request message M1. A fail response can occur if for example, a specific requested external IP address is not available or other resource issues prevent the active network element 110 from provisioning the request. A success response confirms or validates that the request was successfully provisioned on active network element 110. In some situations, if a requested external port cannot be assigned, an alternate port can be assigned instead and a success response will be sent from the active network element 110 to NMS 106.

At step 308, NMS 106 determines if the provisioning request was successful. If not, the NMS 106 can advise operator 102 that the request was not successful and prompt for a new request, or the provisioning request M1 can be re-sent with different parameters. If the provisioning request was successful, at step 310 the NMS 106 sends query message M3 to active network element 110 requesting a list of current mappings for the target address, specifying the same target address as in message M1.

At step 312, NMS 106 receives message M4 from active network element 110, containing a list of current mappings for the target address. In the situation where a requested external port could not be assigned, and an alternate port was assigned instead, the list of current mappings will accurately reflect the mappings actually provisioned on active network element 110.

At step 314, NMS 106 sends query message M5 to NMS database 108 requesting a list of existing mappings for the target address, specifying the same target address as in message M1.

At step 316, NMS 106 receives message M6 from NMS database 108, containing a list of existing mappings for the target address.

At step 318 (S7), NMS 106 determines differences between the current mappings at the active network element 110 and existing mappings on NMS database 108.

At step 320, NMS 106 sends update message M7 to NMS database 108. Message M7 contains the differences between the current mappings at the active network element 110 and existing mappings on NMS database 108, to update the NMS database to reflect the actual mappings on the active network element 110. Thus, the existing mappings stored on NMS database 108 are modified to reflect the additions, modifications and deletions to the mappings on active network element 110. Steps 314, 316, 318 provide the opportunity to perform error checking on the system and raise maintenance flags if there are unexplained differences between mappings stored on the NMS database 108 and on the active network element.

In another embodiment, steps 314, 316, 318 can be replaced with a simplified step of NMS 106 sending an update message to NMS database 108 to replace the existing mappings for the target address in NMS database directly with the current mappings from active network element 110.

At step 322, NMS 106 sends provisioning command message M8 to standby network element 112. Provisioning command message M8 contains the address of the standby network element 112, the target address, and the differences in mappings associated with the target address, similar to the data contained in message M7. Note that this provisioning step is characterized as a provisioning command rather than a provisioning request because the standby network element should reflect the actual provisioning of the active network element. Any resource-dependent issues that would cause a provisioning request failure would already have been reflected in message M2 at step 306.

Embodiments of the present invention can handle multiple standby network elements 112, 114 as shown by example in FIG. 1 in which case, in step 322 NMS 106 sends provisioning command M8 to each standby network element 112, 114 in turn.

Advantageously, embodiments of the present invention provide a method of synchronizing active and standby routers providing network address translation services where the routers do not have an internal synchronization protocol or where the active and standby routers are from different manufacturers and do not have a common control protocol.

The solution is applicable for the case where the static port forwarding creation request is for allocation of any outside port where a coordination medium exists. In this case, the port is allocated dynamically and this solution determines what the allocation is, then it request creation of an identical static port forwarding mapping for the standby chassis . . . .

A person of skill in the art would readily recognize that steps of various above-described methods can be performed by programmed computers. Herein, some embodiments are also intended to cover program storage devices, e.g., digital data storage media, which are machine or computer-readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Numerous modifications, variations and adaptations may be made to the embodiment of the invention described above without departing from the scope of the invention, which is defined in the claims.

What is claimed is:

1. A method performed by a network management system for synchronizing an active network element and one or more standby network elements, the method comprising steps of:

Sending to said active network element a provisioning request for a static mapping for a target address;

Receiving from said active network element a current list of mappings corresponding to said target address;

Updating a management system database with said current list of mappings corresponding to said target address; and Sending to said one or more standby network elements, a provisioning command for said static mapping for said target address.

2. The method of claim 1, further comprising between said step of sending to said active network element a provisioning request and said step of receiving from said network management database a list of mappings, steps of:

Receiving from said active network element a success/fail response; and

Responsive to receiving said success response, sending a query to said active network element for mappings corresponding to said target address.

3. The method of claim 1, wherein said step of updating a management system database comprising steps of:

Sending a query to said network management database for mappings corresponding to said target address;

Receiving from said network management database a list of mappings corresponding to said target address;

Determining a difference between said current list of mappings from said active network element to said list of mappings from said network management database; and Sending an update to said management system database of said difference.

4. The method of claim 1, wherein said network elements comprise routers supporting network address translation (NAT).

5. The method of claim 1, wherein said target address comprises an internal Internet Protocol (IP) address.

6. The method of claim 5 wherein said target address further comprises a port number.

7. The method of claim 1 wherein said network management system communicates with each said network element using a communication protocol selected from the set of: Simple Network Management Protocol (SNMP); Command Line interface (CLI); and Network Configuration Protocol (NETCONF).

8. The method of claim 7 wherein at least one of said network elements is from a different vendor than the other of said network elements.

9. The method of claim 1 wherein said provisioning request comprises a specific IP address mapping for said target address.

10. The method of claim 1 wherein said provisioning request is selected from the set of: creating a new mapping; modifying an existing mapping; and deleting an existing mapping.

11. The method of claim 1 preceded by a step of receiving said provisioning request from a network operator via an Operation Support Services (OSS) Interface.

12. A tangible and non-transitory machine-readable storage medium encoded with instructions for execution by a network management system for synchronizing an active network element and one or more standby network elements, the tangible and non-transitory machine-readable storage medium comprising:

instructions for sending to said active network element a provisioning request for a static mapping for a target address;

instructions for receiving from said active network element a current list of mappings corresponding to said target address;

instructions for sending a query to a network management database for mappings corresponding to said target address;

instructions for receiving from said network management database a list of mappings corresponding to said target address;

instructions for determining a difference between said current list of mappings from said active network element to said list of mappings from said network management database;

instructions for sending an update to said management system database of said difference; and instructions for sending to said one or more standby network elements, a provisioning command for said static mapping for said target address.

* * * * *